(12) United States Patent
Agarwal et al.

(10) Patent No.: US 11,093,252 B1
(45) Date of Patent: Aug. 17, 2021

(54) LOGICAL AVAILABILITY ZONES FOR CLUSTER RESILIENCY

(71) Applicant: Cisco Technology, Inc., San Jose, CA (US)

(72) Inventors: Rahul Agarwal, Milpitas, CA (US); Abhishek Chaturvedi, Fremont, CA (US); Bhargav Kosaraju, Santa Clara, CA (US); Arvind Pruthi, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 212 days.

(21) Appl. No.: 16/434,595

(22) Filed: Jun. 7, 2019

Related U.S. Application Data

(60) Provisional application No. 62/839,051, filed on Apr. 26, 2019.

(51) Int. Cl.
    *G06F 9/46*      (2006.01)
    *G06F 9/38*      (2018.01)
    *G06F 9/50*      (2006.01)
    *G06F 3/06*      (2006.01)

(52) U.S. Cl.
    CPC ............ *G06F 9/3891* (2013.01); *G06F 3/067* (2013.01); *G06F 3/0619* (2013.01); *G06F 3/0647* (2013.01); *G06F 9/5077* (2013.01); *G06F 9/5083* (2013.01)

(58) Field of Classification Search
    CPC .... G06F 9/5083; G06F 9/5077; G06F 3/3891; G06F 3/067; G06F 3/0647; G06F 3/0619; H04L 67/1097; H04L 67/1095
    See application file for complete search history.

(56) References Cited

U.S. PATENT DOCUMENTS

| | | | |
|---|---|---|---|
| 8,417,679 B1 * | 4/2013 | Lyle ........................ | G06F 16/13 707/696 |
| 9,378,067 B1 * | 6/2016 | Agarwala ......... | G06F 15/17331 |
| 9,582,421 B1 | 2/2017 | Agarwala et al. | |
| 9,619,179 B2 * | 4/2017 | Milos ................... | G06F 3/0611 |
| 9,965,203 B1 | 5/2018 | Agarwala et al. | |
| 10,169,169 B1 | 1/2019 | Shaikh et al. | |
| 10,860,427 B1 * | 12/2020 | Chakraborty ....... | G06F 11/1464 |
| 2006/0251111 A1 | 11/2006 | Kloth et al. | |
| 2007/0291785 A1 | 12/2007 | Sharma et al. | |
| 2008/0065704 A1 * | 3/2008 | MacCormick ...... | G06F 16/1844 |
| 2013/0176115 A1 * | 7/2013 | Puleston ............. | H01Q 1/2225 340/10.51 |

(Continued)

*Primary Examiner* — Emerson C Puente
*Assistant Examiner* — Zhi Chen
(74) *Attorney, Agent, or Firm* — Edell, Shapiro & Finnan, LLC

(57) ABSTRACT

Presented herein are techniques that automate data replication in a cluster by defining and managing logical availability zones. Nodes belonging to a same logical availability zone may be brought down together without impacting data availability. Thus, logical availability zones enable easier data management for events such as when nodes must be brought offline for troubleshooting or upgrading, while also providing resiliency against regional outages. Further, present embodiments define logical availability zones and assign nodes to zones in a manner that reduces the amount of data movement that is necessary, thereby requiring fewer computational resources.

20 Claims, 5 Drawing Sheets

(56) References Cited

U.S. PATENT DOCUMENTS

2017/0249310 A1* 8/2017 Kumar ................ G06F 12/0813
2018/0188977 A1* 7/2018 Sehgal ................. G06F 3/0613
2019/0370079 A1* 12/2019 Ramesh ................. G06F 3/061

* cited by examiner

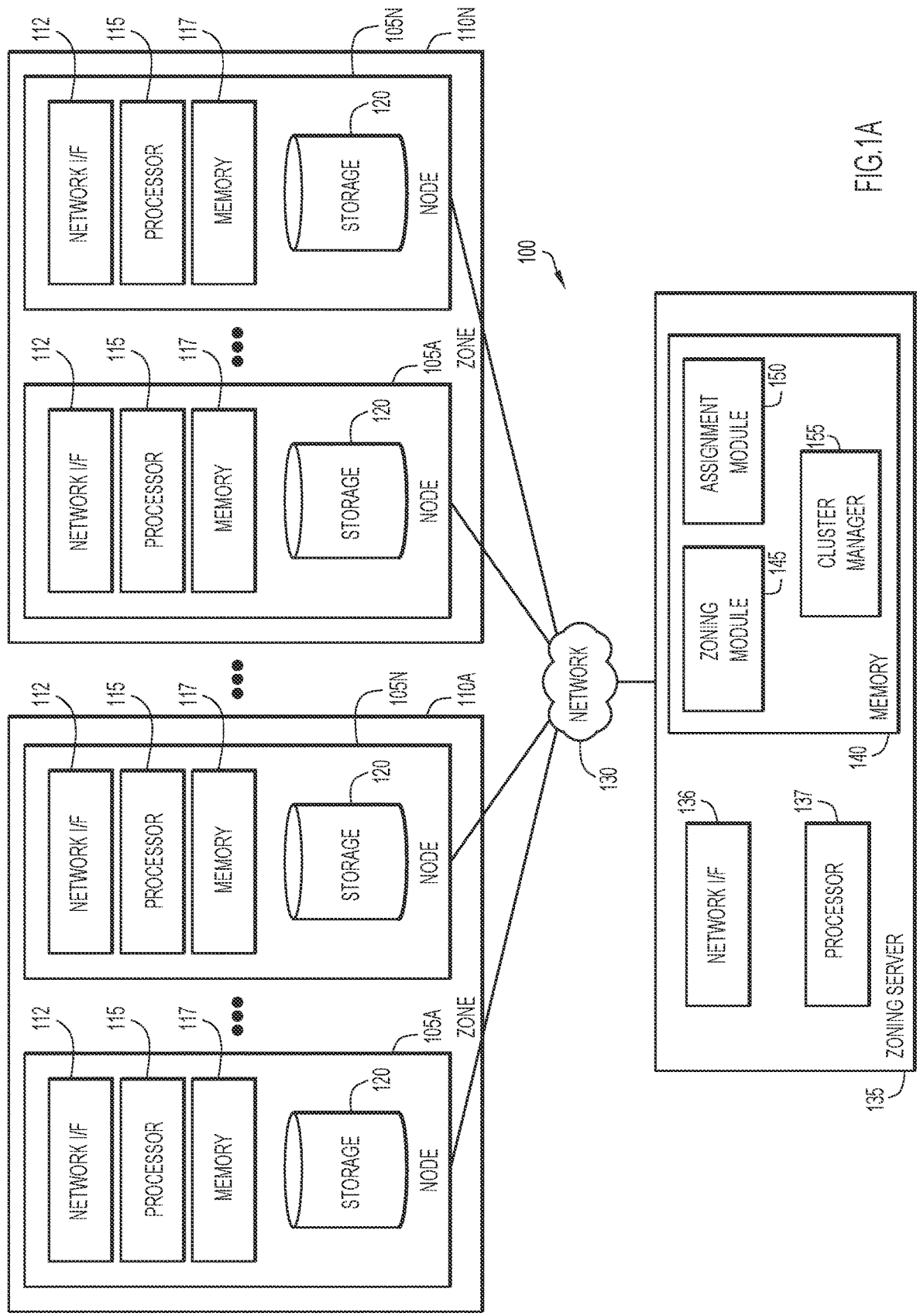

LOGICAL AVAILABILITY ZONES FOR CLUSTER RESILIENCY

PRIORITY CLAIM

This application claims priority to U.S. Provisional Application No. 62/839,051, filed Apr. 26, 2019, and entitled LOGICAL AVAILABILITY ZONES FOR CLUSTER RESILIENCY, the entirety of which is incorporated herein by reference.

TECHNICAL FIELD

The present disclosure relates to zoning resources of storage clusters in order to ensure resiliency.

BACKGROUND

A storage cluster that employs data replication may place replicas across multiple disks in disparate nodes. As the size of a cluster increases, the probability of simultaneous disk or node failures also increases, thereby increasing the likelihood of losing all of the copies of a particular chunk of replicated data. Manual configuration of a storage cluster is error-prone, and cannot adequately address the addition or removal of nodes in a timely manner.

BRIEF DESCRIPTION OF THE DRAWINGS

FIG. 1A is a block diagram depicting an environment for providing logical availability zones for a storage cluster, in accordance with an example embodiment.

DESCRIPTION OF EXAMPLE EMBODIMENTS

Overview

Figure 1B:
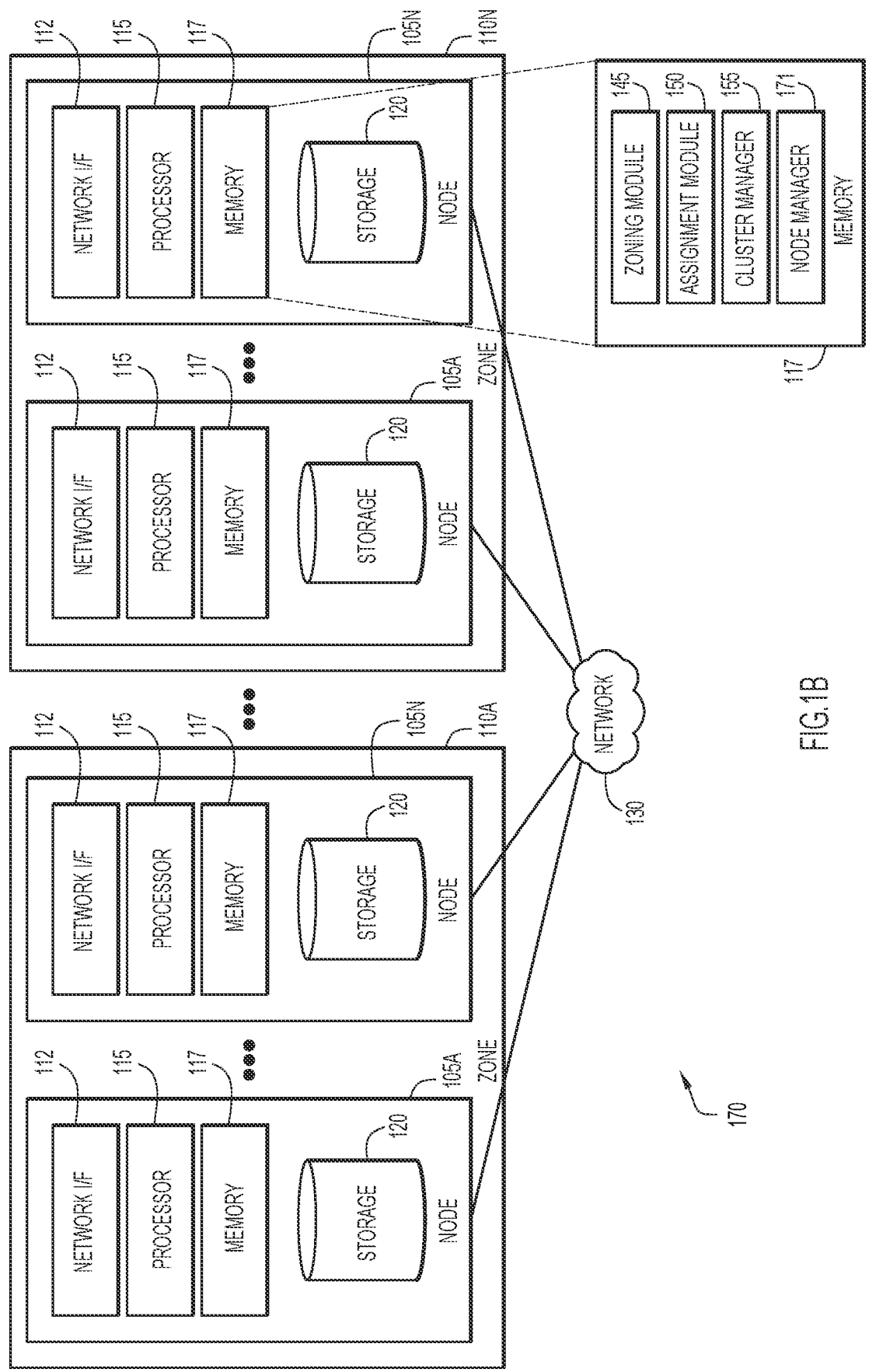
FIG. 1B is a block diagram depicting an environment for providing logical availability zones for a storage cluster, in accordance with an example embodiment.

In one embodiment, a computer-implemented method provides logical availability zones for a storage cluster. A zone number comprising one or more zones is determined for a storage cluster comprising a plurality of nodes, wherein the zone number is based on a count of the plurality of nodes and a replication factor, and wherein each node includes one or more constraints. Each node is assigned to a zone of the one or more zones based on the one or more constraints of the node. Data chunks are redistributed between nodes.

Example Embodiments

The present disclosure relates to zoning resources of storage clusters in order to ensure resiliency. A storage cluster may store data across multiple computing devices that are referred to as nodes. Data may be replicated across multiple nodes in order to provide resiliency against data loss due to node failure. However, when all of the nodes that contain replicas of a particular chunk of data fail, that chunk of data may be inaccessible.

Conventional approaches to providing data resiliency may involve partitioning resources based on physical and geographical locations. For example, when data replicas are stored in two or more data centers that are geographically remote from each other, it is unlikely that a single power outage would render all replicas of the data inaccessible. However, manual configuration of a data cluster can introduce errors, such as data replicas being stored on nodes that are more likely to fail simultaneously. Further, manual configuration cannot dynamically allocate data in an optimal and timely manner, especially when a cluster is scaled up or scaled down by the addition or removal of nodes.

Presented herein are embodiments that automate data replication in a cluster by defining and managing logical availability zones. Nodes belonging to a same logical availability zone may be brought down together without impacting data availability. Thus, logical availability zones enable easier data management for events such as when nodes must be brought offline for troubleshooting or upgrading, while also providing resiliency against regional outages. Further, present embodiments define logical availability zones and assign nodes to zones in a manner that reduces the amount of data movement that is necessary, thereby requiring fewer computational resources.

Embodiments are now described in detail with reference to the figures. FIG. 1A is a block diagram depicting an environment 100 for providing logical availability zones for a storage cluster, in accordance with an example embodiment. As depicted, environment 100 includes a plurality of nodes 105A-105N, network 130, and zoning server 135. Each node 105 is assigned to one of the zones 110A-110N. It is to be understood that the functional division among components of network environment 100 have been chosen for purposes of explaining the embodiments and is not to be construed as a limiting example.

Each node 105A-105N includes a network interface (I/F) 112, a processor 115, memory 117, and storage 120. In various embodiments, each node 105A-105N may include any programmable electronic device capable of executing computer readable program instructions. Each node 105A-105N may include internal and external hardware components, as depicted and described in further detail hereinafter with respect to FIG. 4.

In some embodiments, each node is authenticated by, or otherwise registered with, zoning server 135 prior to establishing logical availability zones. Each node 105A-105N may have one or more constraints, such as a service constraint, a data constraint, a geographic constraint, and the like. For example, two nodes that have a same service constraint should not be placed in a same zone, since the service associated with the two nodes may become unavailable if that zone is unreachable. Constraints may be ranked in order of priority in order to ensure that certain constraints may be satisfied before other constraints are satisfied. For example, a service constraint may have a higher priority than a data constraint which in turn may have a higher priority than a geographic constraint.

Storage 120 of each node 105A-105N may include any non-volatile storage media known in the art. For example, storage 120 can be implemented with a tape library, optical library, one or more independent hard disk drives, or multiple hard disk drives in a redundant array of independent disks (RAID). Similarly, data in storage 120 may conform to any suitable storage architecture known in the art, such as a file, a relational database, an object-oriented database, and/or one or more tables. Storage 120 may store any data, and storages 120 of nodes 105A-105N may collectively provide storage for a storage cluster. Each storage 120 may store one or more replicas of a data chunk. In some embodiments, storage 120 may include a storage area network (SAN) or one or more hard disks local to a node. Storage 120 may communicate with server applications via input/output interface only (e.g., serial attached Small Computer System interface (SAS), Serial Advanced Technology Attachment (SATA), InfiniBand, etc.).

Zones 110A-110N may each be a logical availability zone to which one or more nodes may be assigned. A logical availability zone is a software-defined logical partition of a storage cluster that may store replicated data. Each zone 110A-110N may be defined by zoning server 135 and/or its modules, which may also assign nodes 105A-105N to a particular zone. It should be appreciated that network environment 100 provides only an illustration of one embodiment and does not imply any limitations with regard to the number of nodes or zones or assignment of nodes to zones. In particular, present embodiments may include any number of node, which may be grouped into any number of logical availability zones. Zoning may adhere to conventional or other redundancy policies or models, such as a Redundant Array of Independent Servers (RATS) model or a Redundant Array of Independent Nodes (RAIN) model.

Network 130 may include a local area network (LAN), a wide area network (WAN) such as the Internet, or a combination thereof, and includes wired, wireless, or fiber optic connections. In general, network 130 can use any combination of connections and protocols that support communications between any nodes 105A-105N and/or zoning server 135 via their network interfaces.

Zoning server 135 includes a network interface 136, at least one processor 137, and memory 140. Memory 140 may include a zoning module 145, an assignment module 150, and a cluster manager 155. Network interface 136 may include one or more network interface cards that enable the zoning server 135 to send and receive data over a network, such as network 130. In some example embodiments, zoning server 135 creates and manages logical availability zones for one or more storage clusters. Zoning server 135 may include internal and external hardware components, as depicted and described in further detail with respect to FIG. 4.

Zoning module 145, assignment module 150, and cluster manager 155 may include one or more modules or units to perform various functions of present invention embodiments described below. Zoning module 145, assignment module 150, and cluster manager 155 may be implemented by any combination of any quantity of software and/or hardware modules or units, and may reside within memory 140 of zoning server 135 for execution by a processor, such as processor 137.

Zoning module 145 may determine a number of zones that should be created for a cluster of nodes. The number of zones to be created may be a function of the number of nodes of a cluster and the replication factor for data, which may correlate to the desired resiliency for a particular set of data. For example, data with a replication factor (RF) of two is replicated twice in a cluster, whereas data with a replication factor of four may be replicated four times, etc. The replication factor may be provided to zoning server 135 by a user, such as a network administrator.

In some embodiments, zoning module 145 determines a number of zones based on the number of nodes in a cluster, a replication factor, and constraints for the nodes. Each node may have one or more constraints that indicate whether a set of nodes should be placed in different zones to provide high availability. Constraints may be each assigned a weight to indicate a priority of the constraint. For example, a service constraint may have a higher priority than a data constraint, which indicates that the placement of nodes having the service constraint into different zones may be prioritized over the placement of nodes having a constraint that is lower in priority.

Assignment module 150 may determine the assignment of nodes to zones in order to create and manage zones. Nodes may be assigned to zones based on one or more criteria, including the number of nodes and zones for a cluster, the replication factor for a cluster, and the constraints for each node in a cluster. In general, assignment module 150 may not assign nodes to zones if such an assignment would cause a conflict (e.g., as determined according to the constraints of the nodes). For example, assignment module 150 may not assign nodes to a same zone if the assignment would place all of the copies of a particular chunk of data in one zone.

Cluster manager 155 may manage one or more clusters by tracking node-zone relationships as well as node-cluster relationships. Cluster manager 155 may enable scaling of a cluster by adding nodes to the cluster or removing nodes from the cluster. When nodes are added, a cluster may store a larger volume of data and/or may support a higher replication factor for stored data. Cluster manager 155 may enable access to data by processing requests for data and/or directing data requests to the node or nodes upon which the requested data may be accessed. When nodes are added to or removed from a cluster, cluster manager 155 may alert zoning module 145 and/or assignment module 150 so that the number of zones and/or node assignment for the cluster may be recomputed.

Reference is now made to FIG. 1B. FIG. 1B is a block diagram depicting an environment 170 for providing logical availability zones for a storage cluster, in accordance with an example embodiment. As depicted, environment 170 includes a plurality of nodes 105A-105N and network 130. Each node 105 is assigned to one of the zones 110A-110N. It is to be understood that the functional division among components of network environment 100 have been chosen for purposes of explaining the embodiments and is not to be construed as a limiting example.

Environment 170 depicts an embodiment in which the memory 117 of each node 105A-105N is provided with a zoning module 145, an assignment module 150, and a cluster manager 155, as well as a node manager 171. One node per cluster may be selected as a cluster master for managing the zoning of the cluster to which it belongs (e.g., using zoning module 145, assignment module 150, and/or cluster manager 155). A cluster master may be responsible for zone management, including the addition of nodes to zones and removal of nodes from zones. Moreover, a cluster master may perform cluster resource management, including data chunk rebalancing across nodes, detection of new nodes, disk management, and the like. If a cluster master becomes unavailable or stops functioning properly, another node may be selected as a cluster master.

Node manager 171 of each node 105A-105N may communicate with a cluster master and its modules (e.g., zoning module 145, assignment module 150, and cluster manager 155) for cluster resource management activities, including liveness, data chunk movement, and the like.

Figure 2:
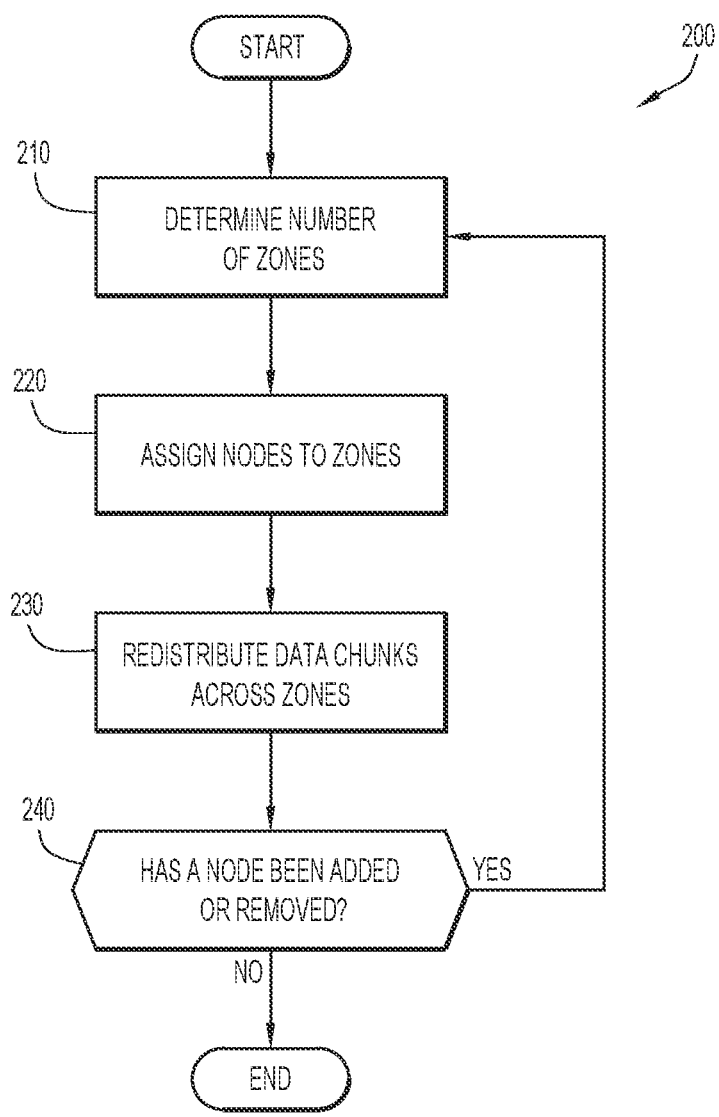
FIG. 2 is a flow chart depicting a method for providing logical availability zones, in accordance with an example embodiment.

Reference is now made to FIG. 2. FIG. 2 is a flow chart depicting a method 200 for providing logical availability zones, in accordance with an example embodiment.

A number of zones for a cluster is determined at operation 210. Zoning module 145 may determine a number of zones (represented as "Zn") that should be created for a cluster of nodes based on the number of nodes (represented as "Nn"), and the replication factor (represented as "RF") for data in the cluster. In some embodiments, zoning is only performed when a cluster has a minimum number of nodes, (represented as "Min N"). Similarly, a maximum number of zones (represented as "Zn_Max") may be defined, since having a large number of zones may negate the advantages of zoning.

In some embodiments, zoning module 145 uses the following five cases to determine a number of zones for a cluster.

Case 1: if Nn<RF, then Zn=0. Thus, if the number of zones is less than the replication factor, a cluster cannot be formed to satisfy the replication factor.

Case 2: if Nn<Min N, then Zn=1. In this second case, if the number of nodes is less than the minimum number of nodes, which may be a user-defined value, then there will be one zone.

Case 3: if Nn fits into RF with a remainder of zero, then Zn=RF. Thus, if the number of nodes in a cluster can be divided by the cluster's replication factor without leaving a remainder, the number of zones will be equal to the replication factor.

Case 4: if there exists an integer value, z, between RF and Zn_Max such that the Nn fits into z with a remainder of zero, then Zn=z. In this fourth case, a number of zones in selected such that the number is between the replication factor and the maximum number of zones, and may also be a divisor of the number of nodes without leaving a remainder.

Case 5: if the conditions for the other cases are not satisfied, then Zn=RF. Thus, the number of zones will be equal to the replication factor.

Table 1 provides an example of the number of zones that may be configured for clusters having various numbers of nodes. In the examples of Table 1, the replication factor for each cluster is three (RF=3).

TABLE 1

| Number of nodes in cluster (Nn) | Resulting number of Zones (Zn) | Case |
|---|---|---|
| 2 | 0 | Case 1 |
| 3 | 1 | Case 2 |
| 8 | 4 | Case 4 |
| 9 | 3 | Case 3 |
| 10 | 5 | Case 4 |
| 11 | 3 | Case 5 |
| 12 | 4 | Case 3 |
| 17 | 3 | Case 5 |
| 18 | 3 | Case 5 |
| 19 | 3 | Case 5 |
| 32 | 4 | Case 4 |

Nodes are assigned to zones at operation 220. Nodes may be assigned to zones based on the constraints of each node. In particular, assignment module 150 of the zoning server 135 may assign nodes having the highest-priority constraints before assigning nodes with lower-priority constraints, thereby ensuring that the most important constraints are satisfied first. Assignment module 150 may assign nodes to zones according to a round-robin assignment.

In one embodiment, for each constraint (represented as "$C_1, C_2, \ldots C_k$") there may be a corresponding priority (represented as "$Pr\_C_1, Pr\_C_2, \ldots Pr\_C_k$") with each priority being higher than the next (e.g., $Pr\_C_1$ may be higher in priority than $Pr\_C_2$, etc.). The ordered list of constraints, $<C_1, C_2, \ldots C_k>$, may be represented as "C," a list of nodes of a cluster may be represented as "P," and a list of all nodes having a particular constraint, $C_x$, may be represented as "$C_x\_P$." The final output of nodes in a given zone may be represented as "PZ," and Z_index may be initialized to zero.

Assignment module 150 may receive a number of zones and nodes. For $C_i$ in C (e.g., the ith constraint), node assignment may follow the following pseudo-code of Table 2:

TABLE 2

For $C_{i+1}$ in C:
  $C_i\_P$ ← closed subset of nodes which needs to satisfy Ci, if any
  $C_i\_P$ ← SetIntersection($C_i\_P$, $C_{i-1}\_P$)
  $C_i\_P\_Remaining$ ← SetSubtraction($C_{i-1}\_P$, $C_i\_P$)
  While ($C_i\_P$ is not empty):
    P ← Remove first element in $C_i\_P$
    PZ[Z_index] ← P
    Z_Index ← (Z_index + 1) % Zn
  While ($C_i\_P\_remaining$ is not empty):
    P ← Remove first element in $C_i\_P$
    PZ[Z_index] ← P
    Z_Index ← (Z_index + 1) % Zn Thus, assignment module 150 may assign nodes that have a higher priority before assigning nodes that have a lower priority (e.g., all nodes of $C_i\_P$ are assigned before assigning nodes in $C_i\_P$ remaining). At each iteration, the value for Z_index is incremented, ensuring that a current node is not assigned to a same zone as a previous node.

Data chunks may be redistributed across nodes in different zones at operation 230. The redistribution of remaining data may be performed according to conventional or other techniques. The physical storage associated with each node may be partitioned into logical storage virtual nodes (vNodes). Load balancing may be achieved by distributing the vNodes over multiple physical nodes (pNodes), which are storage servers that include one or more storage media. In some embodiments, vNodes are balanced to minimize the overuse (e.g., read and/or write operations) of pNodes and to increase the parallelization of the use of pNodes. Cluster manager 155 may maintain a mapping of vNodes to pNodes, which may be updated when nodes are added to a cluster, when nodes are removed from a cluster, when load balancing is performed, etc.

In some embodiments, data chunks are redistributed by calculating a cluster mean, which is a ratio of total disk usage to the total number of disks in a cluster. Disks in the cluster may then be sorted in decreasing order of usage, and data may be redistributed from disks whose usage is greater than the cluster mean to disks whose usage is less than the cluster mean. In some embodiments, data chunks may only be distributed between nodes of a same zone, and not across zones.

Operation 240 determines whether any nodes have been added to or removed from the cluster. If cluster manager 155 determines that a node has been added to or removed from the cluster, then method 200 may return to operation 210 so that logical availability zones can be recomputed and nodes re-assigned.

Figure 3:
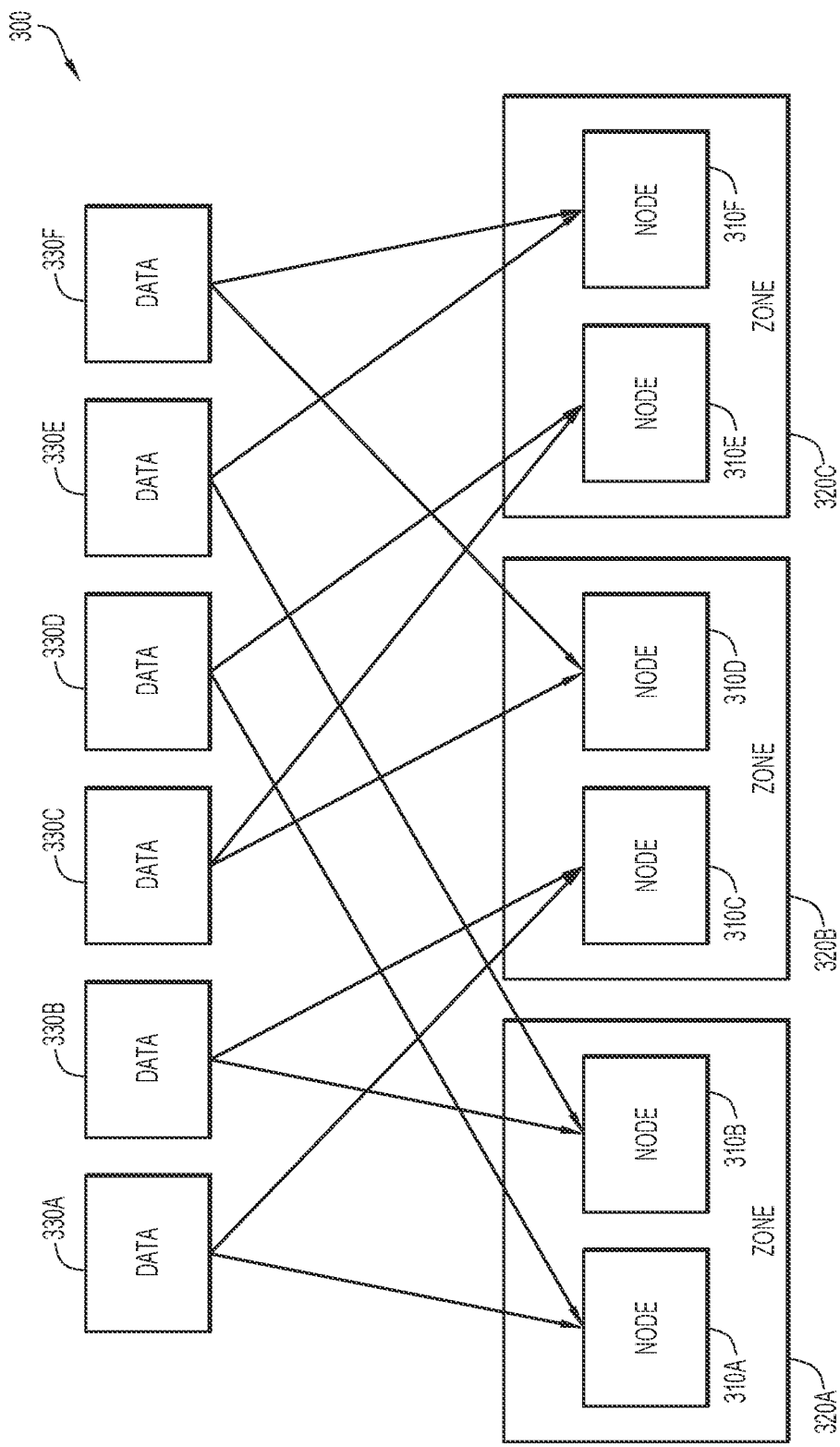
FIG. 3 is a block diagram depicting data chunk assignments in a storage cluster, in accordance with an example embodiment.

FIG. 3 is block diagram depicting data chunk assignment in a storage cluster 300, in accordance with an example embodiment. In storage cluster 300, there are six nodes 310A-310F and three zones 320A-320C, and two nodes are assigned to each zone. Six chunks of data 330A-330F are assigned to the nodes, and the replication factor is equal to two (as indicated by the two arrows associated with each data chunk). Each data chunk 330A-300F may represent a particular volume of data or a service. As depicted, each chunk of data has been assigned to two nodes according to present embodiments. Moreover, each chunk of data has not been assigned to two nodes that have been placed in a same zone. Thus, even if all nodes of a zone become inaccessible, another replica of the data may still be accessible. For example, if zone 320A becomes inaccessible, then data chunks 330A and 330B are still available via node 310C, data chunk 330D is still available via node 310E, and data chunk 330E is still available via node 310F.

Figure 4:
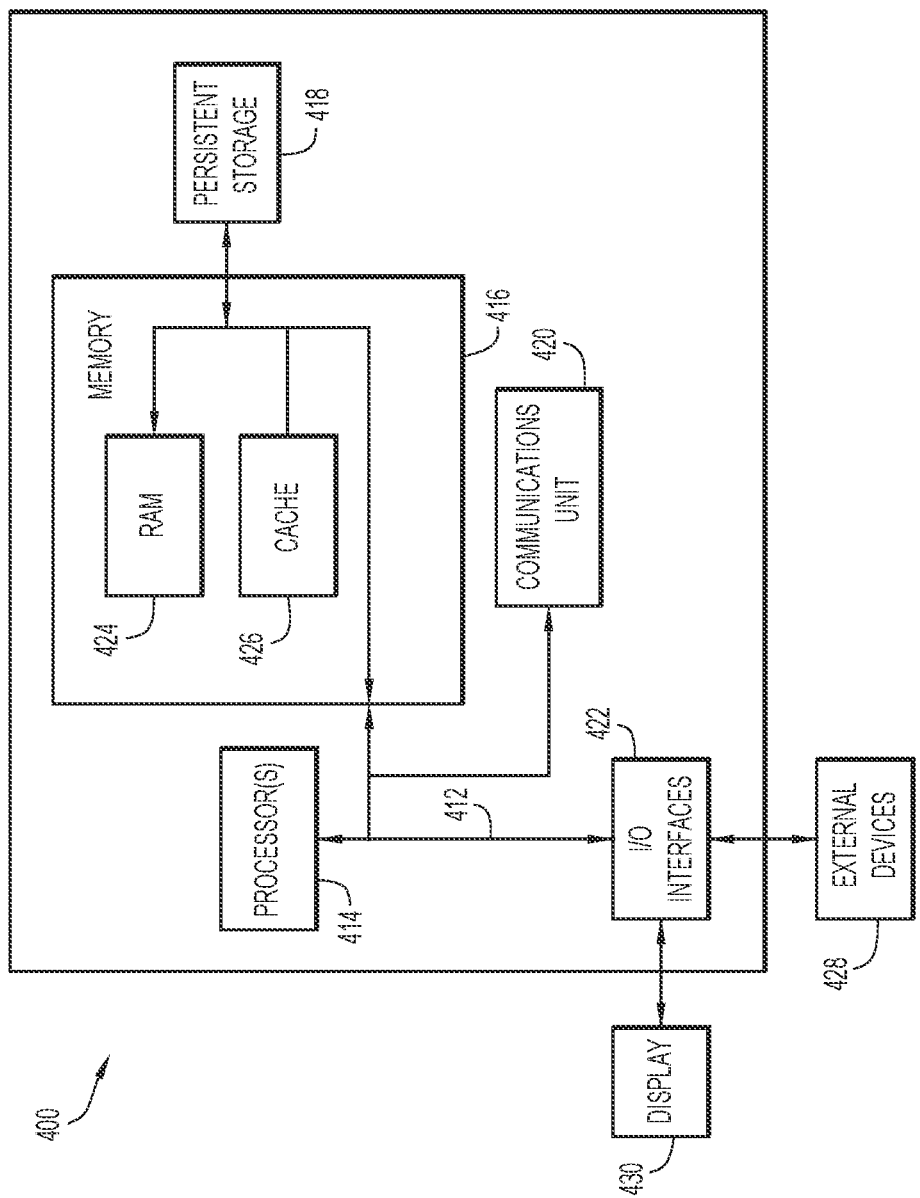
FIG. 4 is a block diagram depicting a computing device configured to perform the methods presented herein, in accordance with an example embodiment.

FIG. 4 is a block diagram depicting components of a computer 400 suitable for executing the methods disclosed herein. Computer 400 may implement zoning server 135 and/or any node 105A-105N in accordance with embodiments presented herein. It should be appreciated that FIG. 4 provides only an illustration of one embodiment and does not imply any limitations with regard to the environments in which different embodiments may be implemented. Many modifications to the depicted environment may be made.

As depicted, the computer 400 includes communications fabric 412, which provides communications between computer processor(s) 414, memory 416, persistent storage 418, communications unit 420, and input/output (I/O) interface(s) 422. Communications fabric 412 can be implemented with any architecture designed for passing data and/or control information between processors (such as microprocessors, communications and network processors, etc.), system memory, peripheral devices, and any other hardware components within a system. For example, communications fabric 412 can be implemented with one or more buses.

Memory 416 and persistent storage 418 are computer readable storage media. In the depicted embodiment, memory 416 includes random access memory (RAM) 424 and cache memory 426. In general, memory 416 can include any suitable volatile or non-volatile computer readable storage media. The memory 416 may store the software instructions for zoning module 145, assignment module 150, and cluster manager 155 in performing the operations described herein.

One or more programs may be stored in persistent storage 418 for execution by one or more of the respective computer processors 414 via one or more memories of memory 416. The persistent storage 418 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 418 may also be removable. For example, a removable hard drive may be used for persistent storage 418. Other examples include optical and magnetic disks, thumb drives, and smart cards that are inserted into a drive for transfer onto another computer readable storage medium that is also part of persistent storage 418.

Communications unit 420, in these examples, provides for communications with other data processing systems or devices. In these examples, communications unit 420 includes one or more network interface cards. Communications unit 420 may provide communications through the use of either or both physical and wireless communications links.

I/O interface(s) 422 allows for input and output of data with other devices that may be connected to computer 10. For example, I/O interface 422 may provide a connection to external devices 428 such as a keyboard, keypad, a touch screen, and/or some other suitable input device. External devices 428 can also include portable computer readable storage media such as, for example, thumb drives, portable optical or magnetic disks, and memory cards.

Software and data used to practice embodiments can be stored on such portable computer readable storage media and can be loaded onto persistent storage 418 via I/O interface(s) 422. I/O interface(s) 422 may also connect to a display 430. Display 430 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to providing logical availability zones (e.g., cluster information, node information, node assignment information, zone information, node constraint information, etc.) may be stored within any conventional or other data structures (e.g., files, arrays, lists, stacks, queues, records, etc.) and may be stored in any desired storage unit (e.g., database, data or other repositories, queue, etc.). The data transmitted between nodes 105A-105N and/or zoning server 135 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to providing logical availability zones (e.g., cluster information, node information, node assignment information, zone information, node constraint information, etc.) may include any information provided to, or generated by, nodes 105A-105N and/or zoning server 135. Data relating to providing logical availability zones may include any desired format and arrangement, and may include any quantity of any types of fields of any size to store any desired data. The data relating to providing logical availability zones may include any data collected about entities by any collection means, any combination of collected information, and any information derived from analyzing collected information.

The present embodiments may employ any number of any type of user interface (e.g., representational state transfer (REST) application programming interfaces (API), Graphical User Interface (GUI), command-line, prompt, etc.) for obtaining or providing information (e.g., data relating to providing logical availability zones), where the interface may include any information arranged in any fashion. The interface may include any number of any types of input or actuation mechanisms (e.g., REST APIs, buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of providing logical availability zones for cluster resiliency.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., zoning module 145, assignment module 150, cluster manager 155 etc.). These systems may include any types of monitors and input devices (e.g., keyboard, mouse, voice recognition, etc.) to enter and/or view information.

It is to be understood that the software (e.g., zoning module 145, assignment module 150, cluster manager 155, etc.) of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments (e.g., zoning module 145, assignment module 150, cluster manager 155, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the presented embodiments.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to providing logical availability zones). The database system may be implemented by any number of any conventional or other databases, data stores or storage structures (e.g., files, databases, data structures, data or other repositories, etc.) to store information (e.g., data relating to providing logical availability zones). The database system may be included within or coupled to the server and/or client systems. The database systems and/or storage structures may be remote from or local to the computer or other processing systems, and may store any desired data (e.g., data relating to providing logical availability zones).

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the present embodiments in the form disclosed. Many modifications and variations will be apparent to those of ordinary skill in the art without departing from the scope and spirit of the presented embodiments. The embodiment was chosen and described in order to best explain the principles of the presented embodiments and the practical application, and to enable others of ordinary skill in the art to understand various embodiments with various modifications as are suited to the particular use contemplated.

The descriptions of the various embodiments of the present embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of the presented embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, RAM, ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Aspects of the present embodiments are described herein with reference to flowchart illustrations and/or block diagrams of methods, apparatus (systems), and computer program products according to presented embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various presented embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one form, a computer-implemented method is provided comprising: determining a zone number comprising one or more zones for a storage cluster comprising a plurality of nodes, wherein the zone number is based on a count of the plurality of nodes and a replication factor, and wherein each node includes one or more constraints; assigning each node to a zone of the one or more zones based on the one or more constraints of the node; and redistributing data chunks between nodes.

The operation of determining the zone number may include in response to determining that the count of the plurality of nodes is less than a minimum number of nodes, selecting a zone number equal to one, in response to determining that the count of the plurality of nodes fits into a replication factor without leaving a remainder, selecting a zone number equal to the replication factor, in response to determining that an integer exists between the replication factor and a maximum zone number in which the count of the plurality of nodes fits into the integer without leaving a remainder, selecting a zone number equal to the integer, and in response to determining that the count of the plurality of nodes is more than the minimum number nodes, determining that the count of the plurality of nodes does not fit into the replication factor without leaving a remainder, and determining that the integer does not exist, selecting a zone number equal to the replication factor.

The operation of assigning each node to a zone may include ranking nodes based on priorities of the one or more constraints of each node, and assigning nodes to zones iteratively based on the ranking of the nodes, wherein each successive node is assigned to a different zone than a previous node.

The operation of redistributing the data chunks between nodes may include calculating a cluster mean comprising a ratio of total disk usage of each disk of a group of nodes to a total number of disks in the group of nodes, and moving one or more data chunks from disks whose usage is greater than the cluster mean to disks whose usage is less than the cluster mean. In one form, the group of nodes comprises all nodes assigned to a zone. In another form, the group of nodes comprises the plurality of nodes in the cluster.

In another form, an apparatus is provided comprising: a communication interface configured to enable network communications; one or more computer processors; one or more computer readable storage media; program instructions stored on the one or more computer readable storage media for execution by at least one of the one or more computer processors, the program instructions including instructions for a cluster master in a cluster of nodes, and when executed by the one or more computer processors, cause the one or more computer processors to: determine a zone number comprising one or more zones for a storage cluster comprising a plurality of nodes, wherein the zone number is based on a count of the plurality of nodes and a replication factor, and wherein each node includes one or more constraints; assign each node to a zone of the one or more zones based on the one or more constraints of the node; and redistribute data chunks between nodes.

In another form, one or more non-transitory computer readable storage media are provided that are encoded with instructions that, when executed by a processor, cause the processor to: determine a zone number comprising one or more zones for a storage cluster comprising a plurality of nodes, wherein the zone number is based on a count of the plurality of nodes and a replication factor, and wherein each node includes one or more constraints; assign each node to a zone of the one or more zones based on the one or more constraints of the node; and redistribute data chunks between nodes.

In summary, the techniques presented herein solve the problem of improving resiliency of a large storage cluster using software based automated zoning. This approach partitions resources into different fault domains in software with no administrator assistance and when no knowledge of physical fault domains. There is no management overhead with the approach and since there is no zone configuration specified, the software has the flexibility to reconfigure the fault domains as needed in a way that increases the availability and resiliency of the storage cluster. The approach significantly reduces maintenance operation time (like upgrade maintenance) as all nodes in a given zone could be brought down together without affecting the availability of the system. Software based zoning also allows for different zoning at separate layers of the storage cluster in a way that improves the availability of the system.

Furthermore, these techniques minimize data movement when new zones are created or zones are reconfigured. This provides a seamless experience to the user to benefit from the flexibility of changing fault domains on-the-fly and yet keeping data movement to minimal.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for providing logical availability zones for a storage cluster, the method comprising:
    determining a zone number comprising one or more zones for a storage cluster comprising a plurality of nodes, wherein the zone number is determined to be equal to a replication factor based on a count value of the plurality of nodes being no less than a minimum number of nodes at the storage cluster and a remainder of dividing the count value of the plurality of nodes by the replication factor being equal to zero, wherein the replication factor indicates a number of replicas of data of the storage cluster, and wherein each node includes one or more constraints;
    assigning each node to a zone of the one or more zones based on the one or more constraints of the node; and
    redistributing data chunks between two or more nodes of the plurality of nodes across different zones to minimize overuse of the plurality of nodes.

2. The computer-implemented method of claim 1, wherein assigning each node to a zone comprises:
    ranking nodes based on priorities of the one or more constraints of each node, and
    assigning nodes to zones iteratively based on the ranking of the nodes, wherein each successive node is assigned to a different zone than a previous node.

3. The computer-implemented method of claim 1, wherein redistributing the data chunks between two or more nodes comprises:
    calculating a cluster mean comprising a ratio of total disk usage of each disk of a group of nodes to a total number of disks in the group of nodes; and
    moving one or more data chunks from disks whose usage is greater than the cluster mean to disks whose usage is less than the cluster mean.

4. The computer-implemented method of claim 3, wherein the group of nodes comprises the plurality of nodes in the cluster.

5. The computer-implemented method of claim 1, wherein determining a zone number and assigning each node to a zone is performed by a node that is designated as a cluster master for the plurality of nodes, and further comprising:
    in response to determining that the cluster master is offline, selecting another node to be the cluster master.

6. The computer-implemented method of claim 1, wherein the replication factor is defined by an administrator of the storage cluster.

7. The computer-implemented method of claim 1, wherein the zone number does not exceed a predefined maximum zone number.

8. An apparatus comprising:
    a communication interface configured to enable network communications;
    one or more computer processors;
    one or more computer readable storage media;
    program instructions stored on the one or more computer readable storage media for execution by at least one of the one or more computer processors, the program instructions including instructions for a cluster master in a cluster of nodes, and when executed by the one or more computer processors, cause the one or more computer processors to:

determine a zone number comprising one or more zones for a storage cluster comprising a plurality of nodes, wherein the zone number is determined to be equal to a replication factor based on a count value of the plurality of nodes being no less than a minimum number of nodes at the storage cluster and a remainder of dividing the count value of the plurality of nodes by the replication factor being equal to zero, wherein the replication factor indicates a number of replicas of data of the storage cluster, and wherein each node includes one or more constraints;

assign each node to a zone of the one or more zones based on the one or more constraints of the node; and redistribute data chunks between two or more nodes of the plurality of nodes across different zones to minimize overuse of the plurality of nodes.

9. The apparatus of claim 8, wherein the program instructions to assign each node to a zone cause the one or more computer processors to:

rank nodes based on priorities of the one or more constraints of each node, and assign nodes to zones iteratively based on the ranking of the nodes, wherein each successive node is assigned to a different zone than a previous node.

10. The apparatus of claim 8, wherein the program instructions to redistribute the data chunks between two or more nodes cause the one or more computer processors to:

calculate a cluster mean comprising a ratio of total disk usage of each disk of a group of nodes to a total number of disks in the group of nodes; and move one or more data chunks from disks whose usage is greater than the cluster mean to disks whose usage is less than the cluster mean.

11. The apparatus of claim 10, wherein the group of nodes comprises the plurality of nodes in the cluster.

12. The apparatus of claim 8, wherein the program instructions to determine a zone number and to assign each node to a zone are executed by one or more processors of a node that is designated as a cluster master for the plurality of nodes, and further comprising:

in response to determining that the cluster master is offline, selecting another node to be the cluster master.

13. The apparatus of claim 8, wherein the replication factor is defined by an administrator of the storage cluster.

14. One or more non-transitory computer readable storage media encoded with program instructions that, when executed by a processor, cause the processor to:

determine a zone number comprising one or more zones for a storage cluster comprising a plurality of nodes, wherein the zone number is determined to be equal to a replication factor based on a count value of the plurality of nodes being no less than a minimum number of nodes at the storage cluster and a remainder of dividing the count value of the plurality of nodes by the replication factor being equal to zero, wherein the replication factor indicates a number of replicas of data of the storage cluster, and wherein each node includes one or more constraints;

assign each node to a zone of the one or more zones based on the one or more constraints of the node; and redistribute data chunks between two or more nodes of the plurality of nodes across different zones to minimize overuse of the plurality of nodes.

15. The one or more non-transitory computer readable storage media of claim 14, wherein the program instructions to assign each node to a zone cause the processor to:

rank nodes based on priorities of the one or more constraints of each node, and assign nodes to zones iteratively based on the ranking of the nodes, wherein each successive node is assigned to a different zone than a previous node.

16. The one or more non-transitory computer readable storage media of claim 14, wherein the program instructions to redistribute the data chunks between two or more nodes cause the processor to:

calculate a cluster mean comprising a ratio of total disk usage of each disk of a group of nodes to a total number of disks in the group of nodes; and move one or more data chunks from disks whose usage is greater than the cluster mean to disks whose usage is less than the cluster mean.

17. The one or more non-transitory computer readable storage media of claim 16, wherein the group of nodes comprises the plurality of nodes in the cluster.

18. The one or more non-transitory computer readable storage media of claim 14, wherein the zone number does not exceed a predefined maximum zone number.

19. The one or more non-transitory computer readable storage media of claim 14, wherein the program instructions to cause the processor to determine a zone number and assign each node to a zone are performed by a node that is designated as a cluster master for the plurality of nodes, and wherein the program instructions further cause the processor to:

in response to determining that the cluster master is offline, select another node to be the cluster master.

20. The one or more non-transitory computer readable storage media of claim 14, wherein the replication factor is defined by an administrator of the storage cluster.

* * * * *